United States Patent
Brown et al.

(10) Patent No.: US 7,512,658 B2
(45) Date of Patent: Mar. 31, 2009

(54) PROVIDING A PORTION OF AN ELECTRONIC MAIL MESSAGE BASED UPON A TRANSFER RATE, A MESSAGE SIZE, AND A FILE FORMAT

(75) Inventors: Michael W. Brown, Georgetown, TX (US); Michael A. Paolini, Austin, TX (US); Newton J. Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 10/788,022

(22) Filed: Feb. 26, 2004

(65) Prior Publication Data

US 2005/0193070 A1    Sep. 1, 2005

(51) Int. Cl.
G06F 15/16 (2006.01)
(52) U.S. Cl. .............. 709/206; 709/207; 379/88.22
(58) Field of Classification Search ......... 709/206–207, 709/232, 233; 379/88.22
See application file for complete search history.

(56) References Cited

U.S. PATENT DOCUMENTS

| | | | |
|---|---|---|---|
| 5,257,369 A | 10/1993 | Skeen et al. | 395/650 |
| 5,530,852 A | 6/1996 | Meske, Jr. et al. | 395/600 |
| 5,537,526 A | 7/1996 | Anderson et al. | 395/148 |
| 5,737,619 A | 4/1998 | Judson | 395/761 |
| 5,748,186 A | 5/1998 | Raman | 345/302 |
| 5,754,173 A | 5/1998 | Hiura et al. | 345/333 |
| 5,774,660 A | 6/1998 | Brendel et al. | 395/200.31 |
| 5,774,668 A | 6/1998 | Choquier et al. | 395/200.53 |
| 5,793,972 A | 8/1998 | Shane | 395/200.49 |
| 5,850,520 A | 12/1998 | Griebenow et al. | 395/200.36 |
| 5,860,074 A | 1/1999 | Rowe et al. | 707/526 |
| 5,878,224 A | 3/1999 | Smith | 395/200.54 |
| 5,918,013 A | 6/1999 | Mighdoll et al. | 395/200.47 |
| 5,953,392 A | 9/1999 | Rhie et al. | 379/88.13 |
| 5,958,006 A * | 9/1999 | Eggleston et al. | 709/219 |
| 5,987,256 A | 11/1999 | Wu et al. | 395/707 |
| 5,987,504 A | 11/1999 | Toga | 709/206 |

(Continued)

FOREIGN PATENT DOCUMENTS

EP    0 947 931 A2    10/1999

(Continued)

OTHER PUBLICATIONS

International PCT/EP2005/050797 Search Report dated Aug. 22, 2005.

(Continued)

Primary Examiner—Frantz B Jean
(74) Attorney, Agent, or Firm—Williams, Morgan & Amerson, P.C.

(57) ABSTRACT

A method and an apparatus for providing a portion of an electronic mail message based upon a transfer rate, a message size, and a file format are presented. The method includes determining whether it is desirable to provide less than all of an electronic mail message and determining a format associated with the electronic mail message in response to determining that it is desirable to provide less than all of the electronic mail message. The method also includes selecting a portion of the electronic mail message using the determined format and providing the selected portion of the electronic mail message.

36 Claims, 8 Drawing Sheets

U.S. PATENT DOCUMENTS

| | | | |
|---|---|---|---|
| 5,996,022 | A | 11/1999 | Krueger et al. ............... 709/247 |
| 6,055,564 | A | 4/2000 | Phaal ......................... 709/207 |
| 6,094,671 | A | 7/2000 | Chase et al. ................. 709/201 |
| 6,098,180 | A | 8/2000 | Kobata et al. .................. 714/18 |
| 6,115,482 | A | 9/2000 | Sears et al. ................. 382/114 |
| 6,134,584 | A | 10/2000 | Chang et al. ................. 709/219 |
| 6,148,330 | A | 11/2000 | Puri et al. ................... 709/217 |
| 6,154,769 | A | 11/2000 | Cherkasova et al. ......... 709/207 |
| 6,161,126 | A | 12/2000 | Wies et al. ................... 709/203 |
| 6,182,125 | B1 | 1/2001 | Borella et al. ............... 709/218 |
| 6,243,761 | B1 | 6/2001 | Mogul et al. ................ 709/246 |
| 6,256,666 | B1 | 7/2001 | Singhal ....................... 709/217 |
| 6,256,672 | B1 | 7/2001 | Redpath ...................... 709/232 |
| 6,275,848 | B1 | 8/2001 | Arnold ....................... 709/206 |
| 6,311,210 | B1 | 10/2001 | Foladare et al. ............. 709/206 |
| 6,311,215 | B1 | 10/2001 | Bakshi et al. ............... 709/221 |
| 6,345,298 | B1 | 2/2002 | Moriya ........................ 709/228 |
| 6,381,709 | B1 | 4/2002 | Casagrande et al. ........... 714/18 |
| 6,401,132 | B1 | 6/2002 | Bellwood et al. ........... 709/246 |
| 6,405,240 | B1 | 6/2002 | Tsubone et al. ............. 709/203 |
| 6,421,733 | B1 | 7/2002 | Tso et al. .................... 709/246 |
| 6,430,624 | B1 | 8/2002 | Jamtgaard et al. ........... 709/246 |
| 6,438,592 | B1 | 8/2002 | Killian ........................ 709/224 |
| 6,449,637 | B1 | 9/2002 | Toga ........................... 709/206 |
| 6,460,074 | B1 | 10/2002 | Fishkin ....................... 709/206 |
| 6,510,469 | B1 | 1/2003 | Starnes et al. ............... 709/247 |
| 6,535,896 | B2 | 3/2003 | Britton et al. ............... 707/523 |
| 6,563,913 | B1 | 5/2003 | Kaghazian ............... 379/93.24 |
| 2002/0016818 | A1 | 2/2002 | Kirani |
| 2002/0054335 | A1* | 5/2002 | Sekiguchi ................... 358/1.15 |
| 2002/0112010 | A1 | 8/2002 | Soroker et al. |
| 2002/0138586 | A1 | 9/2002 | Paleiov et al. |
| 2003/0009528 | A1 | 1/2003 | Sharif et al. |
| 2003/0028606 | A1* | 2/2003 | Koopmans et al. .......... 709/206 |
| 2003/0028647 | A1 | 2/2003 | Grosu |
| 2003/0055907 | A1 | 3/2003 | Stiers |
| 2003/0095550 | A1 | 5/2003 | Lewis |
| 2003/0163515 | A1 | 8/2003 | Loveland et al. |
| 2003/0163531 | A1 | 8/2003 | Nakajima |
| 2004/0249962 | A1* | 12/2004 | Lecomte ..................... 709/229 |
| 2005/0010644 | A1* | 1/2005 | Brown et al. ................ 709/206 |

FOREIGN PATENT DOCUMENTS

| | | |
|---|---|---|
| EP | 0 967 559 A1 | 12/1999 |
| EP | 1 079 311 A2 | 2/2001 |
| EP | 1 126 380 A1 | 8/2001 |
| JP | 2001-45279 | 2/2001 |
| WO | 99/57657 | 11/1999 |
| WO | 03/010634 A2 | 2/2003 |
| WO | 03/036492 A1 | 5/2003 |

OTHER PUBLICATIONS

International Search Report dated Jun. 17, 2005; 5 pages.

Hadjadj et al., "*Making the Internet Accessible to the Visually Handicapped*," RESNA Jun. 1998, cover page and pp. 269-271.

Kieninger et al., "*Hyperbraille—A Hypertext System for the Blind*," Assets '94, Oct. 1994.

International Business Machines Corporation; Research Disclosure entitled *Electronic Mail Attachment Selector*, Jan. 2002, 2 pages.

Mazzocchi, *eXtensible Server Pages (XSP) Layer 1*, Jun. 11, 1999, http://xml.coverpages.org/WD-xsp-19990611.html.

Smith, et al.; U.S. Appl. No. 09/292,191 entitled "*An Apparatus for Scheduled Service of Network Requests and a Method Therefor*," filed Apr. 15, 1999, 28 pages.

Dutta; U.S. Appl. No. 09/428,409 entitled "*Delayed Delivery of Web Pages Via E-Mail or Push Techniques From an Overloaded or Partially Functional Web Server*," filed Oct. 28, 1999, 38 pages.

Dutta, et al.; U.S. Appl. No. 09/458,646 entitled "*Electronic Document Delivery System Employing Distributed Documents Object Model (DOM) Based Transcoding*," filed Dec. 9, 1999, 52 pages.

Dutta, U.S. Appl. No. 09/543,310 entitled *Sending Full-Content Data to a Second Data Processing System While Viewing Reduced-Content Data on a First Data Processing System*, filed Apr. 5, 2000, 35 pages.

Ban; U.S. Appl. No. 10/660,008 entitled "*Method and Apparatus for Fast Communication with Symbol Linked Object Based System*," filed Sep. 11, 2003, 14 pages.

Providing a Portion Of An Electronic Mail Message At A Reduced Resolution.

Providing Notification of An Undelivered Portion of An Electronic Mail Message Based Upon A Scheduled Time.

Providing A portion of An Electronic Mail Message Based Upon Digital Rights.

Providing A Portion Of An Electronic Mail Message Based Upon A Transfer Rate And A Message Size.

Office Action Dated Dec. 27, 2007 for U.S. Appl. No. 10/787,981.

Final Office Action Dated Apr. 29, 2008 for U.S. Appl. No. 10/787,981.

Office Action Dated Nov. 28, 2007 for U.S. Appl. No. 10/788,999.

Final Office Action Dated Apr. 29, 2008 for U.S. Appl. No. 10/788,999.

Office Action Dated Apr. 18, 2008 for U.S. Appl. No. 10/787,998.

Office Action Dated Jul. 23, 2008 for U.S. Appl. No. 10/787,982.

\* cited by examiner

PROVIDING A PORTION OF AN ELECTRONIC MAIL MESSAGE BASED UPON A TRANSFER RATE, A MESSAGE SIZE, AND A FILE FORMAT

BACKGROUND OF THE INVENTION

1. Field of the Invention

This invention relates generally to electronic mail messaging, and, more particularly, to providing a portion of an electronic mail message based upon a transfer rate, a message size, and a file format.

2. Description of the Related Art

Electronic mail has become a central feature of modern life and users have come to expect to receive electronic mail messages at any time and in virtually any place. For example, during the course of one day of travel, a user may receive electronic mail messages at a home desktop computer in the early morning, an office desktop computer in midmorning, via a cell phone or personal digital assistant in a taxi on the way to the airport, on a laptop computer via a wireless local area network while waiting in the airport lounge, via an in-flight telephone on the airplane, and in a hotel room via a high-speed Internet connection provided by the hotel at the end of the day.

Thus, depending on the circumstances, electronic mail messages may be transmitted and/or received by a wide variety of devices at any given time. In addition to the aforementioned end-user devices, such as desktop computers, laptop computers, cell phones, personal digital assistants, and the like, electronic mail messages typically also pass through a variety of network servers, network switches, hubs, routers, transmission lines, wireless transmission media, modems, interface cards, and the like. The transfer rates of these devices and/or media can vary by many orders of magnitude. For example, a laptop computer's modem may be limited to a transfer rate of 56K bits per second, a cable modem may easily provide data at a transfer rate of 1-2 megabits per second, and a T-3 connection may provide data at a transfer rate as high as 40 megabits per second.

The complexity and size of electronic mail messages has increased roughly in proportion with the available transfer rate. Early electronic mail message systems relied upon comparatively slow modems and thus these electronic mail messages were typically limited to short ASCII text documents. Modem electronic mail messaging systems, on the other hand, may utilize high-speed connections to transmit documents containing complex formatting, audio, graphics, video, and the like. For example, a user may send and/or receive an electronic mail messages with a PowerPoint attachment including formatted text, images, and animations. For another example, a user with the appropriate licenses may send and/or receive a feature length movie as an electronic mail message. The size of these files may easily exceed several megabytes, and users may expect to transmit even larger files in the future.

Despite the advantages of using high-speed connections to transmit large information-rich electronic mail messages, the same messages can become problematic when they must be transmitted by a lower speed connection. For example, a user reading electronic mail messages on a laptop computer connected to the Internet via a 14.4K dial-up modem may have to wait an inordinate amount of time for a large electronic mail message to be downloaded through the modem. As another example, a user writing electronic messages on the laptop computer connected to the Internet via a 14.4 KB dial-up modem may want to attach a large document to an electronic mail message, but may have to wait an unreasonable amount of time for the electronic mail message to be uploaded through the modem. In addition, bottlenecks, heavy traffic, device malfunctions, severed transmission lines, geomagnetic storms, and the like can dramatically, and often unpredictably, decrease the transfer rate of even the highest speed networks. Consequently, the user may have to wait an unreasonable amount of time to receive any indication of the content of the electronic mail message, including any attached files.

Moreover, it may be difficult for the user to determine what information may be contained in the electronic mail message without receiving the entire message. For example, conventional electronic mail messaging systems are not typically able to identify and/or provide relevant portions of electronic mail message attachments to the user unless the entire message has been received by the user. This problem is exacerbated by the large number of different file formats or file types that may be included in the attachments.

The present invention is directed to addressing, or at least reducing, the effects of, one or more of the problems set forth above.

SUMMARY OF THE INVENTION

In one aspect of the instant invention, a method of providing a portion of an electronic mail message based upon a transfer rate, a message size, and a file format is presented. The method includes determining whether it is desirable to provide less than all of an electronic mail message and determining a format associated with the electronic mail message in response to determining that it is desirable to provide less than all of the electronic mail message. The method also includes selecting a portion of the electronic mail message using the determined format and providing the selected portion of the electronic mail message. An apparatus for implementing the method, as well as an article comprising one or more machine-readable storage media containing instructions that when executed enable a processor to carry out the method, are also provided.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase.

As will be described in detail below, the present invention provides for intelligent use of the bandwidth available for transmitting electronic mail messages. For example, in one embodiment of the present invention, an e-mail server may autonomously decide whether an e-mail should be uploaded and/or downloaded based upon environmental factors such as a connection speed of a local system to a remote server. In another embodiment, a user may decide, manually or using an automated process based upon selected user preferences, what portions of an e-mail are sent and/or received. The user may also be provided with notifications of what choices are available and what actions have been taken.

Figure 1:
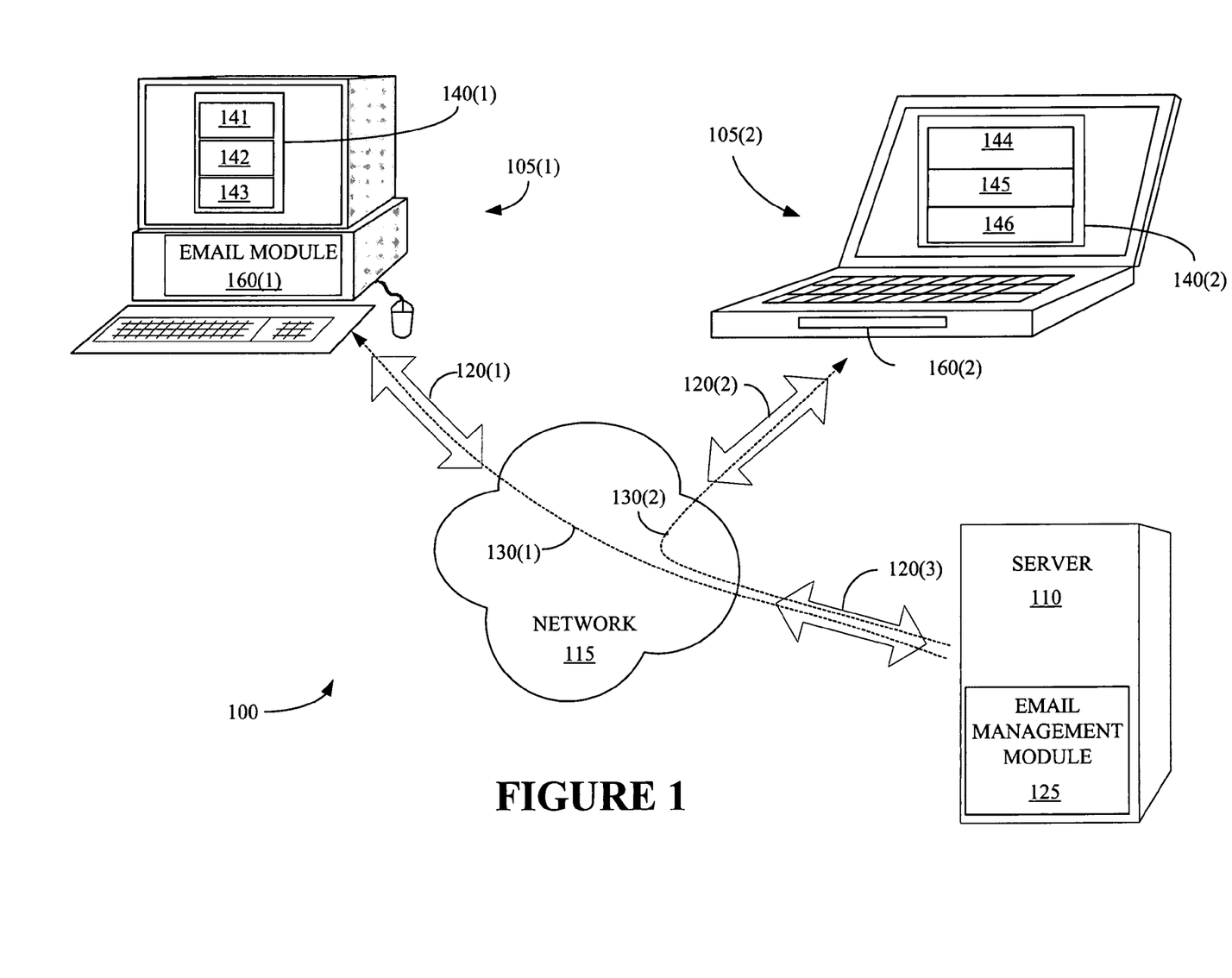
FIG. 1 illustrates a system for practicing one or more embodiments of the present invention.

FIG. 1 illustrates a system 100 for practicing one or more embodiments of the present invention. In particular, FIG. 1 conceptually illustrates an embodiment that includes a plurality of processor-based devices 105(1-2) coupled to a server 110 by a network 115. In the illustrated embodiment, the processor-based device 105(1) is a desktop computer and the processor-based device 105(2) is a laptop computer, although in other embodiments, these processor-based devices 105(1-2) may be any desirable type of computer, personal digital assistant, cellular telephone, and the like.

The server 110, in one embodiment, may be one form of a processor-based device that can be accessed over the network 115. In accordance with one embodiment of the present invention, and as discussed below, the server 110, if desired, provides a less than the entire electronic mail message to a remote user. In one embodiment, the server 110 may be capable of performing tasks such as receiving, queuing, storing, and/or distributing e-mails to one or more users. Although not so limited, in one embodiment, one or more of the described embodiments of the present invention can be implemented within a conventional e-mail server, such as a Microsoft® Exchange Server. In the interest of clarity, the potential functionality of the server 110 not related to the present invention will not be described in further detail, as these tools and/or features are well known to persons of ordinary skill in the art.

In the embodiment illustrated in FIG. 1, the processor-based devices 105(1-2) and the server 10 are communicatively coupled to the network 115 over one or more communications links 120(1-3). In various alternative embodiments, the links 120(1-3) may be one or more of infrared links, wireless local area network (LAN) links, wired LAN connections such as Ethernet connections, cellular network links, circuit board traces, wires, cables, radiofrequency links, satellite links, and the like. Moreover, any desirable protocol may be used for communications between the processor-based devices 105(1-2) and the server 110 via the network 115. For example, a transmission control protocol/Internet protocol (TCP/IP), a user datagram protocol/Internet protocol (UDP/IP), a file transfer protocol or trivial file transfer protocol (FTP/TFTP), and the like may be used.

Figure 2:
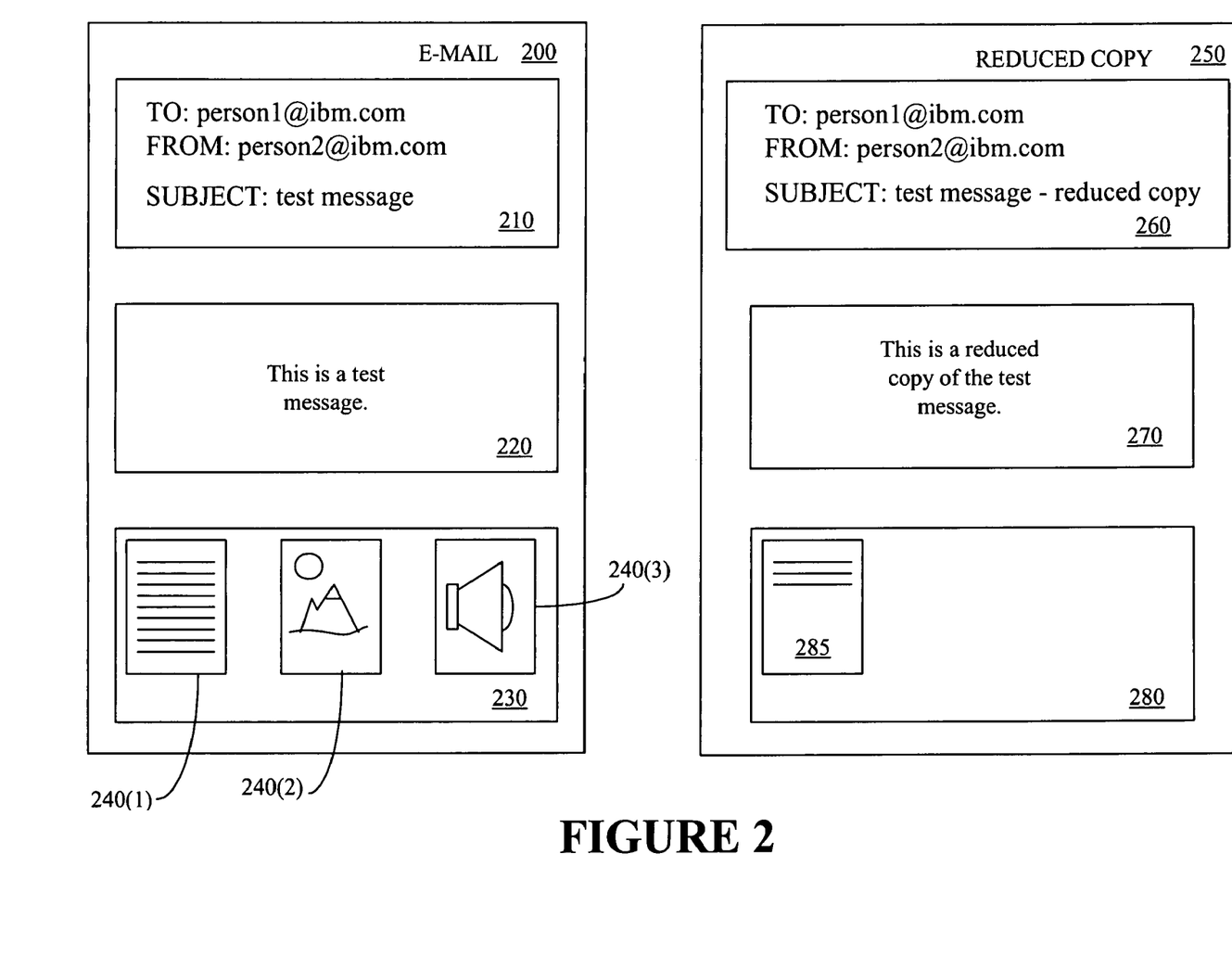
FIG. 2 shows one embodiment of an e-mail that may be stored by an e-mail management module, in accordance with one embodiment of the present invention.

In the embodiment illustrated in FIG. 1, the server 10 includes an e-mail management module 125, which may process (e.g. receive, queue, store, and/or deliver) one or more one or more electronic mail messages, hereinafter referred to as e-mails, in accordance with common usage in the art. One form of an e-mail 200 that may be processed by the e-mail management module 125 is shown in FIG. 2. In the embodiment illustrated in FIG. 2, the e-mail 200 includes a header 210, a body 220, and one or more attachments 230. The header 210 generally includes information indicative of the recipients of the e-mail (i.e. person1@ibm.com), the sender (i.e. person2@ibm.com), and the subject of the e-mail 200 (i.e. test message). The body 220 generally includes the message being conveyed. For example, in the e-mail 200, the body includes a text string, "This is a test message."

The e-mail message 200 shown in FIG. 2 also includes attachments 240(1-3) that, in the illustrated embodiment, include a text document 240(1), a graphics file 240(2), and an audio file 240(3). However, persons of ordinary skill in the art will appreciate that any desirable number of files, as well as any desirable type and/or format of file, may be attached to the e-mail 200. Additionally, it should be appreciated that the e-mail 200 illustrated in FIG. 2 is exemplary in nature, and that in other embodiments it may include more, fewer, or different elements. For example, the e-mail 200 may only include a header 210 and a body 220. As another example, the e-mail 200 may also include routing information that may be used to direct the e-mail 200 to a desired destination.

The attachments 240(1-3) may be created using any a variety of tools. For example, the text document 240(1) may be created using Microsoft Word®, Acrobat Distiller®, Power Point®, Lotus WordPro®, or another document creation or publication tool. The various document creation or publication tools may create files, such as the text document 240(1), in a wide variety of formats. For example, Microsoft Word® may create files in a format that may be read by other document creation or publication tools. For another example, Acrobat Distiller® may create files in Portable Document Format (PDF), which may be read using document reading tools such as Acrobat Reader®. The graphics file 240(2) and the audio file 240(3) may also be created and/or read using a variety of tools employing any number of desirable formats.

The format of the attachments 240(1-3) may be indicated in a variety of manners. In one embodiment, the file name extension may indicate the file format. For example, files in the PDF format may be indicated by the file name extension "pdf." For another example, files in the JPEG format may be indicated by the file name extension "jpg." Alternatively, the format of the attachments 240(1-3) may be indicated by one or more characters, control characters, strings, and the like, which may be included in the attachments 240(1-3). The format of the attachments 240(1-3) may then be determined by parsing a portion of the attachment 240(1-3).

Referring back to FIG. 1, the e-mail management module 125 on the server 110 provides the e-mail 200, or a selected portion, to one or more designated recipients, which, for illustrative purposes, are assumed to be the users of the processor-based systems 105(1-2). Thus, in this illustrative example, the e-mail management module 125 provides at least the selected portion of the e-mail 200 to the processor-based devices 105(1-2). However, persons skilled in the art will appreciate that, in alternative embodiments, any number of users of any desirable processor-based systems may be designated as the recipients and may receive portions of the e-mail 200 provided by the e-mail management module 125. The portion of the e-mail 200 transmitted to the user of each processor-based device 105(1) and 105(2) is hereinafter designated in FIG. 1 by reference numbers 140(1) and 140(2), respectively.

The e-mail management module 125 may provide the e-mail 200 via a variety of communication paths 130(1-2). In the illustrated embodiment, the e-mail management module 125 may transmit a selected portion of the e-mail 200 (designated by reference number 140(1)) to the processor-based device 105(1) along the communication path 130(1), which may include the link 120(3), the network 115, and the link 120(1). The e-mail management module 125 may also transmit a selected portion of the e-mail 200 (designated by reference number 140(2)) to the processor-based device 105(2) along the communication path 130(2), which may include the link 120(3), the network 115, and the link 120(2). Those skilled in the art will appreciate that communications paths 130(1-2) may include one or more intermediate gateways (not shown), routers (not shown), and the like.

As explained above, the data transfer rate along the communication paths 130(1-2) may vary by many orders of magnitude. For example, the communication path 130(1) may consist of a dedicated T-3 connection that may provide data at a transfer rate as high as 40 megabits per second. Accordingly, even if the attachments 240(1-3) attached to the e-mail 200 are large, e.g. 100 MB, the total time required to transfer the copy 140(1) may remain comparatively low, e.g. a few seconds in the case of the 100 MB attachments 240(1-3). In contrast, the communication path 130(2) may include a dial-up connection, such as the link 120(2), which may transfer data at a much lower rate. Thus, a user may have to wait several hours for the 100 MB attachments 240(1-3) to be transferred via the communication path 130(2).

The long transfer time may inconvenience the user, particularly if the user does not necessarily wish to see the entire e-mail 200 and/or the attachments 240(1-3). For example, the user may wish to read a summary of the attachment 240(1) or hear only a segment of an audio file attachment or view only an initial few minutes of a video clip of a video attachment. For another example, the user may want to see a selected portion of an attachment 240(1-3), such as a section or a page. Based upon reviewing a portion of the e-mail 200, the user may then decide whether or not to receive the attachments 240(1), an additional selected portion of the attachment 240(1), and/or the entire e-mail 200. In one embodiment, one or more portions of the attachments 240(1-3) may be assigned a higher priority by, e.g. a user, than other portions of the attachments 240(1-3). In this embodiment, the user may want to see only the highest priority portions of the attachments 240(1-3).

In order to reduce the potential inconvenience to the user and increase the efficiency of the system 100, the e-mail management module 125, in one embodiment, may only transfer a portion of the e-mail 200 along one or more of the communication paths 130(1-2). In particular, the e-mail management module 125 may determine a format of the e-mail 200 and/or the attachments 240(1-3), and then provide a selected portion of the e-mail 200 and/or the attachments 240(1-3) along one or more of the communication paths 130(1-2). As will be discussed in detail below, the e-mail management module 125 may estimate a data transfer rate for the communication paths 130(1-2) and a size of the e-mail 200. In one embodiment, the estimated data transfer rate and the estimated size of the e-mail 200 may be used to estimate the time required to transfer the e-mail 200 along the communication paths 130(1-2).

The e-mail management module 125 may also determine a threshold time, such as a user's maximum preferred time to transfer the e-mail 200, and compare the determined threshold to the estimated e-mail transfer time. For example, the user may select a maximum preferred transfer time of approximately one minute. For another example, the user may select a maximum preferred transfer time of approximately zero minutes to force the e-mail management module to provide a reduced copy 140(2) of all e-mails 200. Alternatively, the threshold time may be a default time.

If the estimated e-mail transfer time is substantially less than the predetermined threshold time, the e-mail management module 125 may transmit substantially all of the e-mail 200. For example, the processor-based device 105(1) may receive the complete copy 140(1) of the e-mail message 200, including a header 141, a body 142, and one or more attachments 143. However, if the estimated e-mail transfer time is substantially more than the predetermined threshold time, and it is not desirable to transmit the entire e-mail 200, the e-mail management module 125 may transmit a portion of the e-mail 200. For example, the processor-based device 105(2) may receive the reduced copy 140(2) of the e-mail message 200, including a header 144, a body 145, and a selected portion of one or more attachments 146.

FIG. 2 shows one embodiment of a reduced copy 250, which includes a header 260 and a body 270. The header 260 includes information indicative of the recipients of the e-mail (i.e. person1@ibm.com), the sender (i.e. person2@ibm.com), and the subject of the e-mail 200 (i.e. test message—reduced copy). The body 270 includes a text string, "This is a reduced copy of the test message." In addition, the body 270 may include other information, such as the estimated size of the attachments 240(1-3), the estimated transfer time for the entire e-mail 200 and/or for the attachments 240(1-3), and the like. In one embodiment, the reduced copy 250 may include a selected portion 280 representative of the contents of one or more of the attachments 240(1-3). In the illustrated embodiment, the selected portion 280 includes a subset 285 of the information included in the text document attachment 240(1). Although not shown in the FIG. 2, the selected portion 280 may include other information, such as portions of the graphics attachment 240(2) and portions of the audio attachment 240(3).

Figure 3:
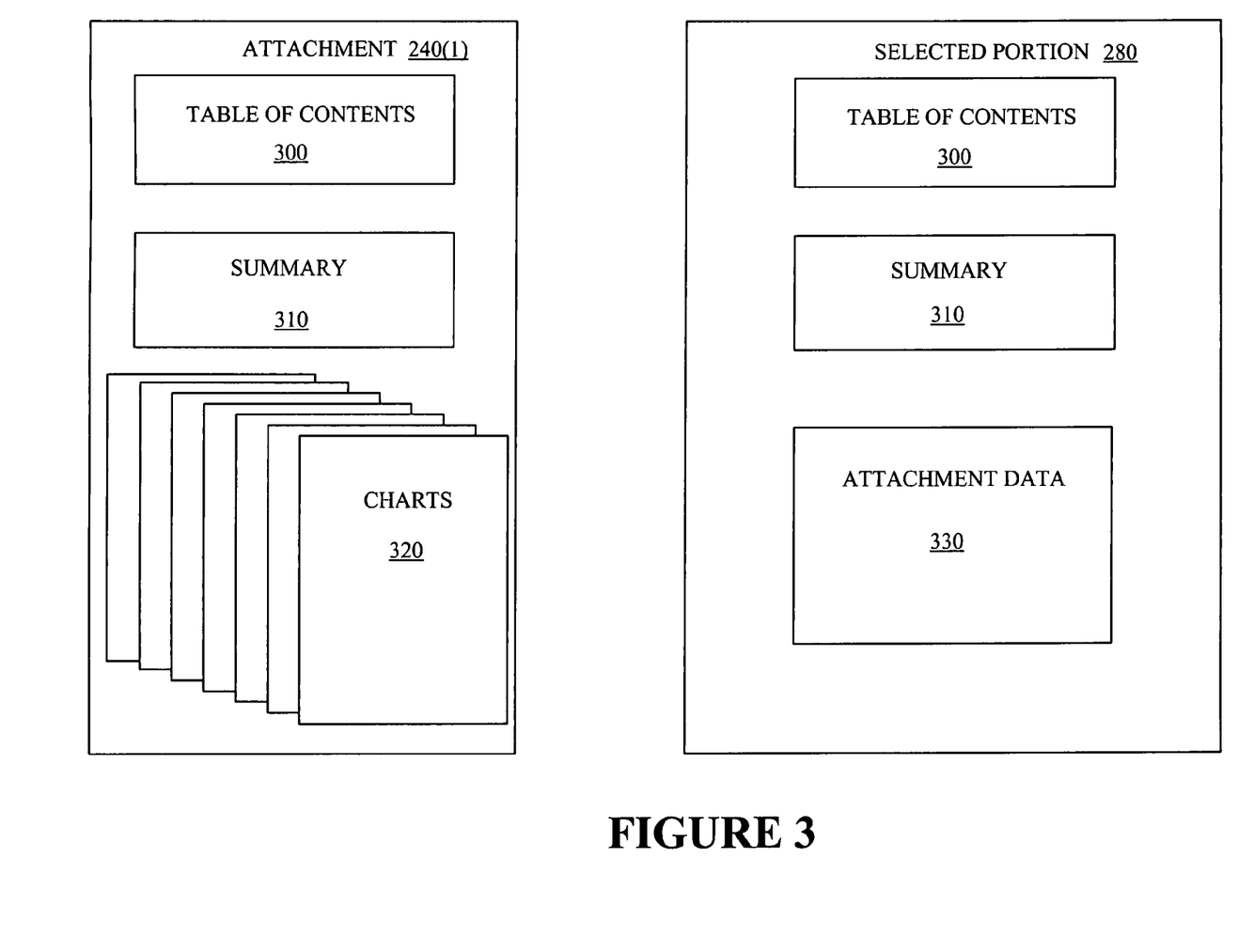
FIG. 3 shows one embodiment of an attachment to an e-mail such as the e-mail shown in FIG. 2.

FIG. 3 illustrates one embodiment of the attachment 240(1) and the selected portion 280 of FIG. 2. In the illustrated embodiment, the attachment 240(1) includes a Table of Contents 300, a Summary 310, and a plurality of charts 320. For example, the attachment 240(1) may be a presentation, such as a Power Point presentation. However, persons of ordinary skill in the art will appreciate that the present invention is not limited to attachments including a Table of Contents 300, a Summary 310, and a plurality of charts 320. In alternative embodiments, the attachment 240(1) may include one or more pages, agendas, audio clips, video clips, sections, chapters, and the like. In one embodiment, the Table of Contents 300, the Summary 310, and the plurality of charts 320, as well as any other portions of the attachment 240(1), may be designated by tags, which may be inserted by a user. In addition, the attachment 240(1) may include background data, setup data, fonts, speaker notes, and the like.

In the illustrated embodiment, the selected portion 280 includes the Table of Contents 300 and the Summary 310. The selected portion 280 may also include additional attachment data 330. For example, the additional attachment data 330 may include information indicating the number of charts 320, the total size of the attachment 240(1), the size of one or more of the charts 320, the format of the attachment 240(1), and the like. For another example, the additional attachment data 330 may include background data, setup data, fonts, speaker notes, and the like. However, persons of ordinary skill in the art will appreciate that the selected portion 280 may include more or fewer selections from the attachment 240(1). Moreover, in some embodiments, the format of the selected portion 280 may not be the same as the format of the attachment 240(1). For example, a selected portion 280 of a PDF file, such as the title of a chart 320, may be provided in Rich Text Format.

Referring back to FIG. 1, the e-mail management module 125 may, in alternative embodiments, "trickle download" the e-mail 200, i.e. successively download portions of the e-mail 200 in the background during one or more sessions, to the processor-based device 105(2). In one embodiment, the e-mail management module 125 may notify the user to indicate what choices are available, e.g. downloading the reduced copy 140(2) or trickle downloading the e-mail 200, and/or what actions have taken place. The e-mail management module 125 may also queue and/or store the e-mail 200. For example, if the reduced copy 140(2) has been transmitted to the processor-based device 105(2), the e-mail 200 may be queued and/or stored until a higher speed connection is available. In one embodiment, the e-mail management module 125 may periodically provide reminders, such as a pop-up dialog box, asking the user to connect to a high-speed connection and/or asking if the user would like to download the e-mail 200.

In one embodiment, the processor-based devices 105(1-2) may include e-mail modules 160(1-2), which may carry out a portion of the aforementioned processes or additional processes. For example, the e-mail modules 160(1-2) may allow a user to set up preferences as to how electronic mail messages are to be handled. When the user is ready to process electronic mail messages, the e-mail modules 160(1-2) may send a message to the server 110, such as a POP3 or IMAP server 110, which may cause various flags to be set based upon the user preferences. Electronic mail messages may then be processed in accordance with the user preferences indicated by the flags, as will be discussed in detail below. The modules 125, 160(1-2) illustrated in FIG. 1 are implemented in software, although in other implementations the modules 125, 160(1-2) may also be implemented in hardware or a combination of hardware and software.

Figure 4:
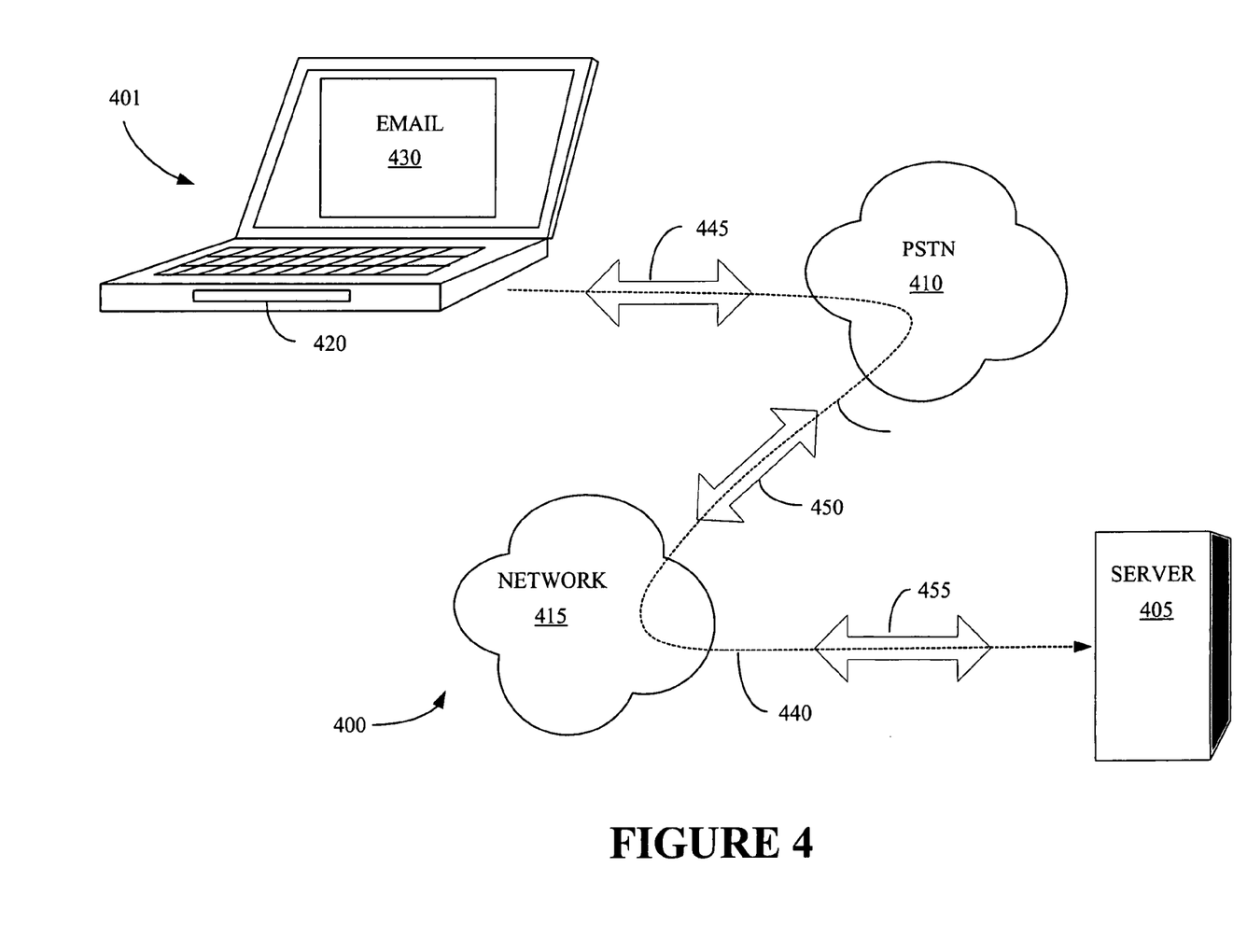
FIG. 4 conceptually illustrates one alternative embodiment of a system that may implement one or more embodiments of the present invention.

FIG. 4 conceptually illustrates a system 400 that may implement one or more alternative embodiments of the present invention. In FIG. 4, a processor-based device 401 is communicatively coupled to a server 405 by a public switched telephone network (PSTN) 410 and a network 415. Thus, the transmission of e-mails from the processor-based device 401 to the server 405 may be implemented in the alternative embodiment shown in FIG. 4. In the illustrated embodiment, the processor-based device 401 includes an e-mail management module 420 that may provide a copy of an e-mail 430 to the server 405. For example, in the illustrated embodiment, the e-mail management module 420 may transmit at least a portion of the e-mail 430 to the server 410 along the communication path 440, which may include the link 445, the public switched telephone network 410, the link 450, the network 415, and the link 455.

As discussed above, the data transfer rate along the communication path 440 may vary by many orders of magnitude. For example, if the processor-based device 401 is linked to the public switched telephone network (PSTN) 410 via a 14.4 KB modem (not shown), it may not be desirable to transmit a 100 MB attachment (not shown) to the server 405. Thus, the e-mail management module 420 may only transmit a portion of the e-mail 430 along the communication path 440. Alternatively, the e-mail 430 may be trickle uploaded to the server 405 along the communication path 440. In one embodiment, the user may assign a priority level to one or more portions of the e-mail 430, which may be used to select a portion of the e-mail 430 to transmit, as will be discussed in detail below.

In one embodiment, after transmitting the portion of the e-mail 430 along the communication path 440, the e-mail management module 420 may queue and/or store the e-mail 430 until a faster connection becomes available. For example, a user may later connect the processor-based device 401 to the network 415 via a higher-speed connection, such as an Ethernet, and then the e-mail management module 420 may transmit the e-mail 430, or an additional portion thereof, using the higher speed connection. In one embodiment, the e-mail management module 420 may periodically provide reminders, such as a pop-up dialog box, asking the user to connect to a high-speed connection and/or asking if the user would like to upload the e-mail 430.

Figure 5:
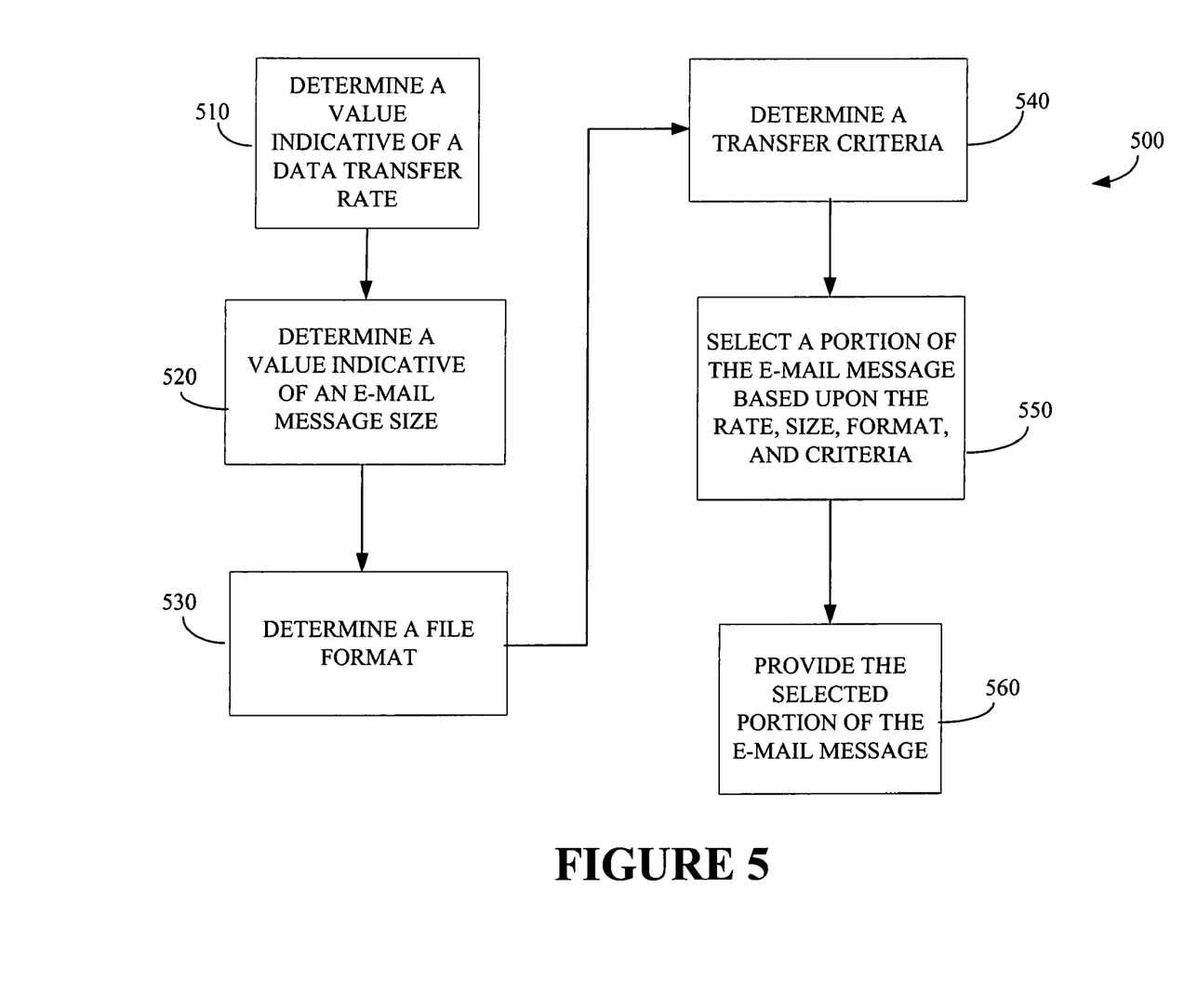
FIG. 5 illustrates one embodiment of a method for providing a portion of an electronic mail message, in accordance with one embodiment of the present invention.

FIG. 5 illustrates one embodiment of the method of 500 for providing a portion of an electronic mail message based upon a data transfer rate, a size of the electronic mail message, and a threshold time. In the illustrated embodiment, a value indicative of, or associated with, a data transfer rate is determined (at 510). For example, an e-mail management module, such as the e-mail management modules 125, 420 and/or the e-mail modules 160(1-2), may determine (at 510) an average data transfer rate using one or more data packets received within a time period. Alternatively, the e-mail management module may determine (at 510) a data transfer rate using a device profile. For example, the e-mail management module may determine (at 510) that a 14.4 KB modem is being used to transmit data and, thus, the e-mail management module may determine (at 510) that the data transfer rate may not exceed approximately 14.4 KB. Persons of ordinary skill in the art should appreciate that the aforementioned techniques for determining (at 510) the data transfer rate are exemplary and not intended to limit the present invention.

A value indicative of, or associated with, a size of an electronic mail message is also determined (at 520). In one embodiment, the e-mail management module may determine (at 520) the size of the electronic mail message by determining (at 520) the number of bits in the electronic mail message. Alternatively, the size of the electronic mail message may be determined (at 520) using information that may be transmitted with the electronic mail message.

A format of at least one file associated with an electronic mail message is determined (at 530). In one embodiment, the e-mail management modules 125, 420 and/or the e-mail modules 160(1-2), may determine (at 530) the format of at least one file associated with the electronic mail message. For example, an attachment to the electronic mail message may be a file having a file name extension of "doc", indicating that the file was created by Microsoft Word,® which may be read by other document creation or publication tools. For another example, an attachment to the electronic mail message may have a file name extension of "pdf, indicating that the file is a PDF file created by Acrobat Distiller®. Alternatively, the e-mail management modules 125, 420 and/or the e-mail modules 160(1-2), may determine (at 530) the format of at least one file associated with the electronic mail message by parsing at least a portion of the file in a manner known to those of ordinary skill in the art.

A mail transfer criteria is also determined (at 540). In the previously discussed embodiments of the present invention, the mail transfer criteria has been associated with a mail transfer threshold time, such as a user's preferred maximum transfer time or a default threshold time. In these embodiments, the mail transfer criteria is determined (at 540) by determining the threshold time using an indication of the user's preferred maximum transfer time, such as a user profile, or an indication of the default threshold time. However, the potential mail transfer criteria are not limited to the threshold time. In alternative embodiments, the mail transfer criteria may include various user preferences such as a maximum size of an attachment, a minimum average data transfer rate, a time of day, a priority level and the like.

Figure 6A:
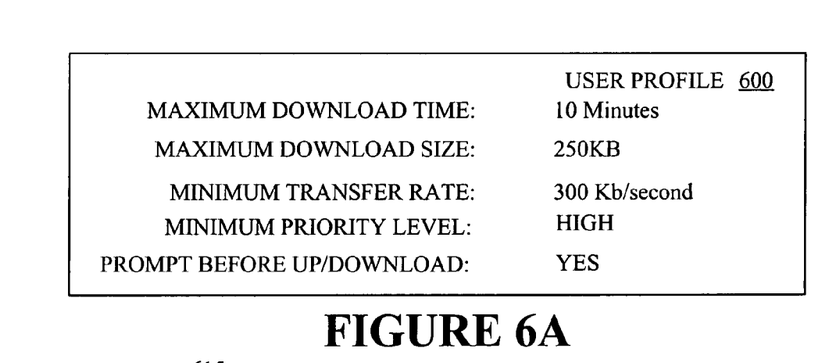
FIG. 6A shows one exemplary embodiment of a user profile, in accordance with one embodiment of the present invention.

In one embodiment, illustrated in FIG. 6A, a user may provide a user profile 600 indicating the user preferences that may be used to determine (at 540) the mail transfer criteria. For example, the user may indicate, via the user profile 600, that e-mails that can be downloaded within a preselected time (e.g., in 10 minutes or less) should be downloaded. Alternatively, the user profile 600 may indicate that e-mails smaller than a preselected size (e.g., about 250 KB or less) should be downloaded and/or that e-mails that can be downloaded at an average rate of greater than a preselected threshold (e.g., about 300 Kbps) should be downloaded. The user profile 600 may also indicate that e-mails having a high priority level should be downloaded and that the user would like to be prompted before uploading and/or downloading portions of the e-mail. In one embodiment, some or all of the information stored in the user profile 600 may be manually provided by the user when the user connects to access the stored e-mails, or, alternatively, the information, if pre-stored, may be made available to a device (e.g., the server 110) desiring access to the stored information. Depending on the implementation, the user profile 600 may be pre-stored at any desirable location, including the processor-based devices 105(1-2), 401, the servers 110, 405, and the like.

For illustrative purposes, it is assumed that the user profile 600 is stored in a convenient location, and, if desired, can be accessed by the appropriate device and/or module, including the e-mail modules 160(1-2), 420, the e-mail management module 125, and the like. In one embodiment, when the user is ready to process one or more of the received e-mails, a message indicative of the information included in the user profile 600 may be sent to a server, such as the servers 110, 405, which may set flags based upon the user preferences. For example, the flags may indicate that the servers 110, 405 should queue e-mails that are to be sent and/or received via a high speed connection, should not download attachments larger that the Maximum Download Size indicated in the user profile 600, should prompt before uploading and/or downloading attachments, and the like.

In some embodiments, flags may also be set on the processor-based-devices 105(1-2), 401 and other devices (not shown) such as third-party proxy servers, e.g. mail servers, and the like. However, persons of ordinary skill in the art should appreciate that the other devices, such as proxy servers, may have additional rules for handling e-mails. For example, a mail server may operate according to a rule that limits the size and/or number of copies of an e-mail that may be sent. The device rules may, in some instances, override the preferences and/or flags that may be determined according to some embodiments of the present invention. For example, the mail server may decline to send copies of a 50 MB e-mail to 100 users, regardless of the preferences that may be indicated by the user profile 600 and/or the flags that may be set on the processor-based-devices 105(1-2), 401 and other devices.

A portion of the electronic mail message is then selected (at 550) based upon the determined data transfer rate, the determined size of the electronic message, the file format, and the mail transfer criteria. In one embodiment, the determined data transfer rate and the determined size of the electronic mail message may be used to estimate the total transfer time for the electronic message. The estimated transfer time may then be compared to the threshold time and, if the estimated transfer time does not exceed the threshold time, substantially all of the electronic mail message may be selected (at 550). However, if the estimated transfer time substantially exceeds the threshold time, a portion of the electronic mail message may be selected (at 550), as described in detail above. In one embodiment, the e-mail management module may also provide the user with an option to select (at 550) the portion of the electronic mail message.

Figure 6B:
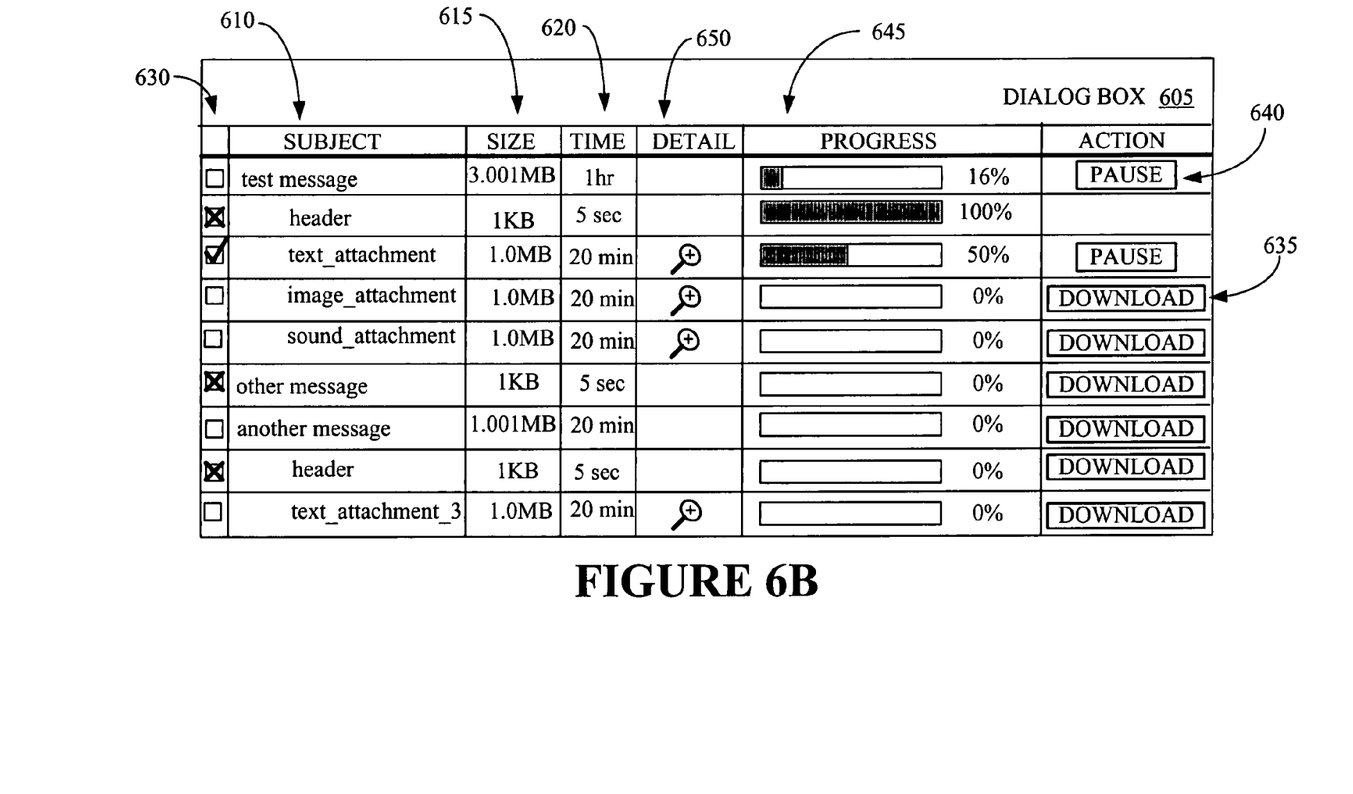
FIG. 6B shows one exemplary embodiment of a dialog box, in accordance with one embodiment of the present invention.

In one embodiment, illustrated in FIG. 6B, a dialog box 605 may be displayed to the user. However, persons of ordinary skill in the art will appreciate that the present invention is not limited to the dialog box 605. In alternative embodiments, any desirable type of user interface, including a graphical user interface or display, may be displayed to the user in order to provide information to, and/or receive information from, the user. The dialog box 605 may display a list of the e-mails and information associated with the e-mails. For example, as shown in FIG. 6B, one entry (indicated by the phrase "test message" in subject field 610) has a size field 615 that indicates that the size of the e-mail is approximately 3.001 MB and a download time field 620 that indicates that the entire e-mail may take approximately one hour to download at the current connection speed. Various portions and/or attachments may also be displayed in the dialog box 605. For example, the size field 615 indicates that the size of the header is approximately 1 KB and the download time field 620 indicates that the header may take approximately 5 seconds to download at the current connection speed. For another example, the size field 615 indicates that the size of the text_attachment is approximately 1.0 MB and the download time field 620 indicates that the text_attachment may take approximately 20 minutes to download at the current connection speed.

The e-mails, portions thereof, and/or attachments displayed in the dialog box 605 may be determined in a variety of ways. In one embodiment, a user may determine the e-mails, portions, and/or attachments displayed in the dialog box 605. For example, a user may create an e-mail including one or more tags that indicate which e-mail portions and/or attachments should be displayed in the dialog box 605. For another example, a user may highlight a portion of the e-mail by clicking-and-dragging over the desired portion of the e-mail using a controllable pointer element, e.g. a mouse, a joystick, and the like. The user may then indicate that the highlighted portion should be displayed in the dialog box 605 by, for example, selecting an option from a drop-down menu using the controllable pointer element. The e-mail management module may then determine displayable information associated with the e-mails including, but not limited to, the size and estimated download time of the e-mail portions and/or attachments. However, persons of ordinary skill in the art should appreciate that the present invention is not limited to embodiments wherein the user determines the portions and/or attachments displayed in the dialog box 605. In alternative embodiments, the e-mail management module may determine the portions and/or attachments displayed in the dialog box 605. For example, the e-mail management module may determine the portions and/or attachments displayed in the dialog box 505 using information such as the user profile, the device profile, the file size, the connection speed, the estimated download time, and the like.

In one embodiment, the e-mail management module may select (at 550) portions of the e-mails to be downloaded. For example, based upon the user profile 600, the e-mail management module may select (at 550) the "header" of the "test message," the "other message," and the "header" of the "another message," as indicated by the X-marks in selection field 630. Alternatively, the user may select (at 550) portions of the e-mail to be downloaded. For example, the user may control a pointer element on the graphical user display with a pointer controller having position and selection status responsive to operation by the user, such as a mouse, a joystick, and the like, to select (at 550) the text_attachment. For example, the user may use a mouse to click the box in the selection field, thereby selecting (at 550) the text_attachment, as indicated by the check-mark in the selection field 630.

The dialog box 605 also includes a detail field 650. In one embodiment, the user may opt to view additional information about the attachment. For example, the user may control a pointer element on the graphical user display with a pointer controller having position and selection status responsive to operation by the user, such as a mouse, a joystick, and the like, to select (at 550) the magnifying glass icon shown in the detail field 650. In one embodiment, the e-mail management module may use the determined (at 530) file format to display a detailed information box 700 that may include information regarding the attachment, as shown in FIG. 7.

Figure 7:
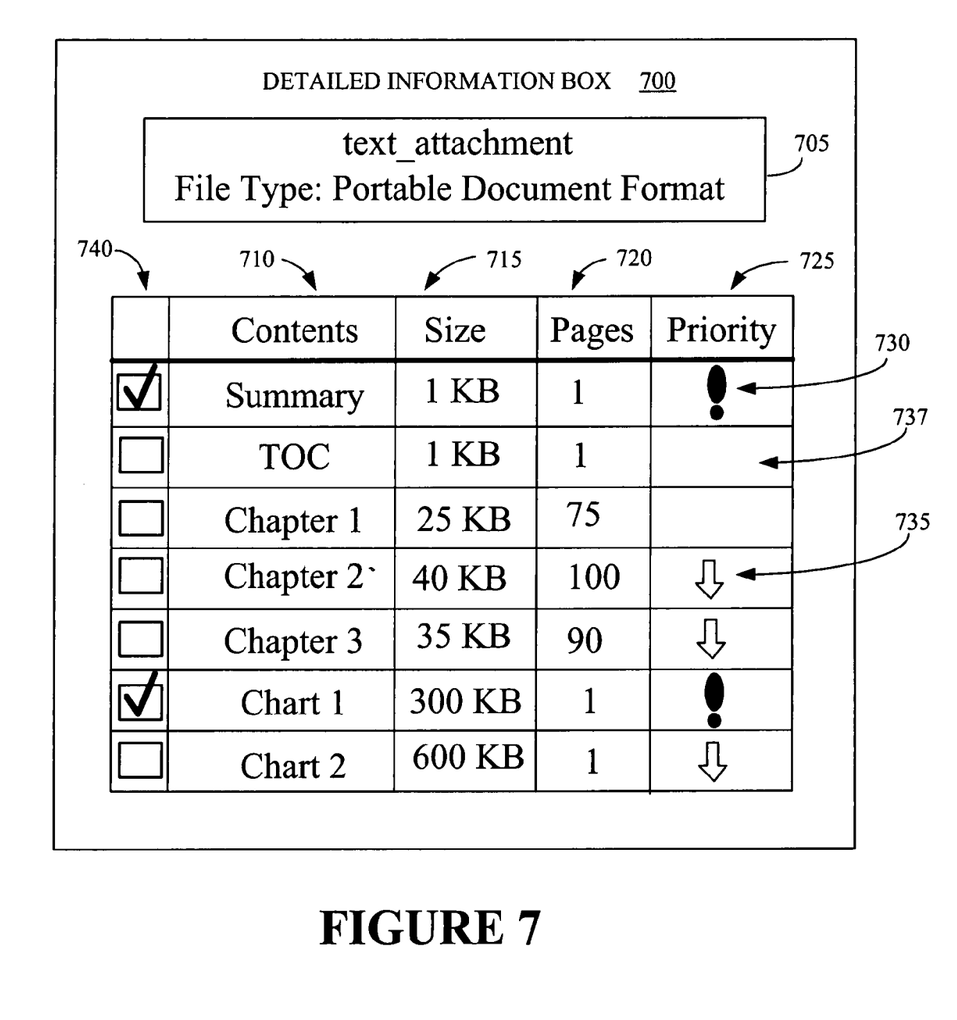
FIG. 7 shows one exemplary embodiment of a detail box, in accordance with one embodiment of the present invention.

The exemplary embodiment of the detailed information box 700 shown in FIG. 7 includes file summary information 705, which may include such information as the filename ("text_attachment"), the file type ("Portable Document Format"), and any other desirable information. The detailed information box 700 also includes information indicative of the content of the attachment. In the illustrated embodiment, this information includes a list of the contents of the attachment, as indicated in content field 710. For example, the text_attachment may include a Summary, a Table of Contents (TOC), Chapters 1-3, and Charts 1-2. The author of the file may designate which portions of the attachment correspond to the content field 710 of the attachment, e.g. the Summary, the Table of Contents (TOC), the Chapters 1-3, and the Charts 1-2, using delimters such as tags, control characters, and the like, which may be understood by the e-mail management module. However, the present invention is not limited to author-inserted delimiters. In alternative embodiments, the content field 710 of the attachment may be determined in any desirable manner, including parsing by the e-mail management module, and the like.

The detailed information box 700 may also include information indicative of a corresponding size field 715 of each portion of the attachment, a page count field 720 of each portion, and the like. In one embodiment, the size field 715, the page count field 720, and any other desirable information may be determined by the e-mail management module. In alternative embodiments, the detailed information box 700 may also include information not shown in FIG. 7, such as an estimated download time of each portion of the attachment, an estimated transfer speed, and the like.

A priority level field 725 may also be associated with one or more portions of the attachment. In one embodiment, the priority level field 725 may indicate at least one of a high priority 730 (indicated by an "!"), a low priority 735 (indicated by a downward-pointing arrow), and an average priority (indicated by a blank field 737). However, persons of ordinary skill in the art should appreciate that any desirable number of priority levels may be indicated in the priority level field 725, and the priority levels may be indicated in any desirable manner including other symbols or characters, colors, attention-getting techniques such as flashing and/or beeping, and the like. The user may designate the priority level that is associated with each portion of the attachment, e.g. the Summary, the Table of Contents (TOC), the Chapters 1-3, and the Charts 1-2, using delimiters such as tags, control characters, and the like, which may be understood by the e-mail management module. Alternatively, the user may designate the priority level using a pointer controller having position and selection status responsive to operation by the user, such as a mouse, a joystick, and the like, to select a priority level 725 interactively using the detailed information box 700. However, the present invention is not limited to user-defined priority levels. In alternative embodiments, the priority level 725 associated with the portions of the attachment may be determined in any desirable manner. For example, the e-mail management module may assign a default priority level to each portion of the attachment. The designated and/or assigned priority level may then be indicated in the priority level field 725.

One or more portions of the attachment corresponding to the contents 710 of the attachment, e.g. the Summary, the Table of Contents (TOC), the Chapters 1-3, and the Charts 1-2, may then be selected (at 550). In one embodiment, the one or more portions of the attachment may be selected (at 550) based upon indicators in one or more of the size fields 715, the page count fields 720, and the priority level fields 725. For example, the Summary and Chart 1 may be selected (at 550), as indicated by the checkmark in the selection field 740. In various alternative embodiments, the one or more portions of the attachment may be selected (at 550) by the user, the author, the e-mail management module, or in any other desirable manner. Moreover, the one or more portions of the attachment may be selected (at 550) in advance, e.g. using the user profile 600, or dynamically, e.g. by the user at the time that the dialog information box 700 is displayed. In alternative embodiments, the one or more portions of the attachment may also be selected (at 550) sequentially. For example, the user may select (at 550) the Summary and select (at 550) Chapter 1 after viewing the Summary.

The selected portion of the electronic mail message is then provided (at 560) to, for example, a processor-based device and/or a server, as discussed in detail above. In one embodiment, the e-mail management module may also provide the user with an option to provide (at 560) the selected portion of the electronic mail message. For example, a dialog box may be displayed to the user and the user may opt to provide (at 560) the selected portion or the user may opt not to provide (at 560) the selected portion. In this embodiment, the selected portion of the electronic mail message is provided (560) in response to the user opting to provide (at 560) the selected portion.

In one embodiment, the electronic mail message is queued and/or stored, e.g. on a client or on a server, after the selected portion of the electronic mail message is provided (at 560). The electronic mail message may remain queued until it becomes desirable to provide the complete electronic mail message. Alternatively, the user may request an additional selected portion of the electronic mail message. In one embodiment, a user may create the electronic mail message on a processor-based device and the selected portion of the electronic mail message may be provided (at 560) to a server and/or another processor-based device. The electronic mail message may remain queued and/or stored on the processor-based device until it becomes desirable to provide the complete electronic mail message, or an additional portion thereof, to the server and/or other processor-based device. Alternatively, the electronic mail message may remain queued and/or stored on a server until it becomes desirable to provide the complete electronic mail message. As discussed above, one or more notifications may be provided to the user indicating that the electronic mail message is queued and/or stored.

Figure 8:
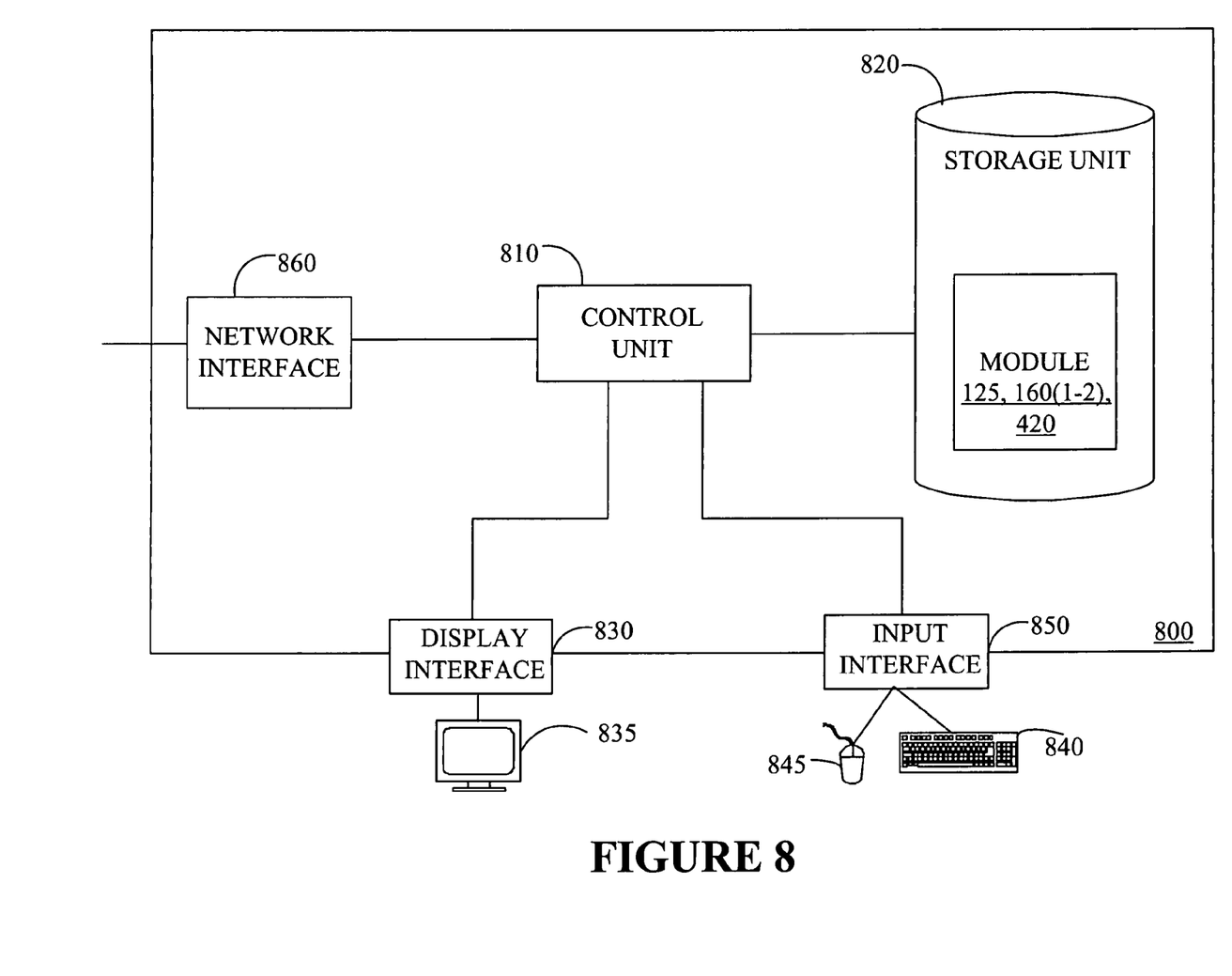
FIG. 8 shows a stylized block diagram of a processor-based device, in accordance with one embodiment of the present invention.

FIG. 8 shows a stylized block diagram of a processor-based device 800, in accordance with one embodiment of the present invention. In one embodiment, the processor-based device 800 may represent portions of the processor-based devices 105(1-2), 401 and/or the servers 110, 405. The device 800, depending on the particular implementation, is configured with the appropriate software configuration, including the e-mail management module 125 or the e-mail modules 160(1-2) of FIG. 1, or with the e-mail management module 420 in the system 400 of FIG. 4.

The device 800 comprises a control unit 810, which in one embodiment may be a processor that is communicatively coupled to a storage unit 820. The software installed in the storage unit 820 may depend on the features to be performed by the device 800. For example, if the device 800 represents one of the processor-based devices 105(1-2), 110, 401, 405 then the storage unit 820 may include the e-mail management modules 125, 420, as well as the e-mail modules 160(1-2). The e-mail management modules 125, 420 and the e-mail modules 160(1-2) may be executable by the control unit 810. Although not shown, it should be appreciated that in one embodiment an operating system, such as Windows®, Disk Operating System®, Unix®, OS/2®, Linux®, MAC OS®, or the like, may be stored on the storage unit 820 and be executable by the control unit 810. The storage unit 820 may also include device drivers for the various hardware components of the device 800.

In the illustrated embodiment, the device 800 includes a display interface 830. The device 800 may display information on a display device 835 via the display interface 830. In the illustrated embodiment, a user may input information using an input device, such as a keyboard 840 and/or a mouse 845, through an input interface 850. The control unit 810 is coupled to a network interface 860, which may be adapted to receive, for example, a local area network card. In an alternative embodiment, the network interface 860 may be a Universal Serial Bus interface or an interface for wireless communications. The device 800 communicates with other devices through the network interface 860. Although not shown, associated with the network interface 860 may be a network protocol stack, with one example being a UDP/IP or a TCP/IP stack. In one embodiment, both inbound and outbound packets may be passed through the network interface 860 and the network protocol stack.

It should be appreciated that the block diagram of the device 800 of FIG. 8 is exemplary in nature and that in alternative embodiments, additional, fewer, or different components may be employed without deviating from the spirit and scope of the instant invention. For example, if the device 800 is a computer, it may include additional components such as a system bus or an I/O bus. In other embodiments, the various elements of the device 800 may be interconnected using various buses and controllers. Similarly, depending on the implementation, the device 800 may be constructed with other desirable variations without deviating from the spirit and scope of the present invention.

The various system layers, routines, or modules may be executable on control units, such as the control unit 810. The control unit 810 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed or removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 810 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   determining from transfer criteria whether to provide less than all of an electronic mail message;
   determining a format associated with the electronic mail message in response to determining to provide less than all of the electronic mail message;
   selecting a portion of the electronic mail message based on the determined format;
   generating a reduced copy of the electronic mail message from the selected portion; and
   transmitting the reduced copy to a user.

2. The method of claim 1, wherein determining whether it is desirable to provide all of the electronic mail message comprises:
   determining a value associated with a data transfer rate;
   determining a value associated with a size of the electronic mail message; and
   determining a mail transfer criteria.

3. The method of claim 2, wherein determining the value associated with the data transfer rate comprises determining the value associated with the data transfer rate based upon a device profile.

4. The method of claim 2, wherein selecting the portion of the electronic mail message comprises:
  estimating a transfer time using the determined value associated with the data transfer rate and the determined value associated with the size of at least one file associated with the electronic mail message; and
  comparing the threshold time and the estimated transfer time.

5. The method of claim 2, wherein determining the value associated with the data transfer rate comprises determining an average data transfer rate based upon data in at least one received data packet and a time period associated with the received data packet.

6. The method of claim 1, wherein transmitting the reduced copy includes: transmitting the reduced copy from a server to a processor based device.

7. The method of claim 1, further comprising:
  providing a user an option to determine the selected portion;
  receiving a user input indicating a choice to exercise the option; and
  providing the selected portion in response to the user opting to provide the selected portion.

8. The method of claim 1, further comprising trickle uploading the electronic mail message.

9. The method of claim 1, further comprising providing an additional selected portion of the electronic mail message at a later time after transmitting the reduced copy.

10. The method of claim 1, further comprising trickle downloading the electronic mail message.

11. The method of claim 1, further comprising:
  storing the electronic mail message; and
  transmitting the stored electronic mail message when a faster connection becomes available.

12. An article comprising one or more machine-readable storage media containing instructions that when executed enable a processor to:
  access an electronic mail message for delivery to a remote device;
  determine from transfer criteria whether to provide less than all of the electronic mail message;
  determine a format associated with the electronic mail message in response to determining to provide less than all of the electronic mail message;
  select a portion of the electronic mail message using the determined format;
  generate a reduced copy of the electronic mail message from the selected portion; and
  transmit the reduced copy to the remote device.

13. The article of claim 12, wherein the instructions that when executed further enable the processor to:
  determine a value associated with a data transfer rate;
  determine a value associated with a size of the electronic mail message; and
  determine a mail transfer criteria.

14. The article of claim 13, wherein the instructions that when executed further enable the processor to:
  estimate a transfer time using the determined value associated with the data transfer rate and the determined value associated with the size of at least one file associated with the electronic mail message; and
  compare the threshold time and the estimated transfer time.

15. The article of claim 12, wherein the instructions that when executed further enable the processor to store the electronic mail message.

16. The article of claim 12, wherein the instructions that when executed further enable the processor to provide an additional selected portion of the electronic mail message at a time after providing the selected portion of the electronic mail message.

17. The article of claim 12, wherein the instructions that when executed further enable the processor to transmit the electronic mail message.

18. An apparatus, comprising:
  an interface; and
  a control unit coupled to the interface and adapted to:
    determine from transfer criteria whether to provide less than all of an electronic mail message;
    determine a format associated with the electronic mail message in response to determining to provide less than all of the electronic mail message;
    select a portion of the electronic mail message using the determined format;
    generate a reduced copy of the electronic mail message from the selected portion; and
    transmit the reduced copy.

19. The apparatus of claim 18, wherein the control unit is further adapted to:
  determine a value associated with a data transfer rate;
  determine a value associated with a size of the electronic mail message; and
  determine a mail transfer criteria.

20. The apparatus of claim 18, wherein the control unit is further adapted to:
  estimate a transfer time using the determined value associated with the data transfer rate and the determined value associated with the size of at least one file associated with the electronic mail message; and
  compare the threshold time and the estimated transfer time.

21. The apparatus of claim 18, wherein the control unit is further adapted to store the electronic mail message.

22. The apparatus of claim 18, wherein the control unit is further adapted to provide an additional selected portion of the electronic mail message at a time after providing the selected portion of the electronic mail message.

23. The apparatus of claim 18, wherein the control unit is further adapted to transmit the electronic mail message.

24. A system, comprising:
  a first processor based device adapted to provide an electronic mail message;
  a second processor based device adapted to receive the electronic mail message; and
  at least one module adapted to:
    determine from transfer criteria whether to provide less than all of an electronic mail message;
    determine a format associated with the electronic mail message in response to determining to provide less than all of the electronic mail message;
    select a portion of the electronic mail message using the determined format; and
    generate a reduced copy of the electronic mail message from the selected portion; and
    transmit the reduced copy.

25. The system of claim 24, wherein the first processor based device is an electronic mail server and the second processor based device is a remote client.

26. The system of claim 24, wherein the first processor based device is a remote client and the second processor based device is an electronic mail server.

27. The system of claim 24, wherein the control unit is adapted to:
  determine a value associated with a data transfer rate;
  determine a value associated with a size of the electronic mail message;

estimate a transfer time using the determined value associated with the data transfer rate and the determined value associated with the size of the electronic mail message; and compare the threshold time and the estimated transfer time.

28. A method for interfacing with a user of a computer system having a graphical user display, comprising:

determining whether it is desirable to provide less than all of an electronic mail message;

determining a format associated with the electronic mail message in response to determining that it is desirable to provide less than all of the electronic mail message;

selecting at least one portion of the electronic mail message having the determined format;

displaying at least one text string indicative of the at least one portion of the electronic mail message;

displaying at least one indication of a priority level of the at least one portion of the electronic mail message;

displaying at least one selection field corresponding to the at least one portion of the at least one electronic mail message;

monitoring the position and selection status of a pointer controller to detect that one of the at least one selection fields has been selected by the user; and altering the appearance of the selected one of the at least one selection fields in response to detecting that one of the at least one selection fields has been selected by the user.

29. The method of claim 28, further comprising displaying at least one of a size field, a page field, and an estimated download time corresponding to the at least one portion of the at least one electronic mail message.

30. The method of claim 29, further comprising modifying a priority level of the at least one portion of the at least one electronic mail message in response to detecting that at least one priority level field has been selected by the user.

31. The method of claim 28, further comprising controlling a pointer element on the graphical user display with a user pointer controller, the pointer controller having position and selection status responsive to operation by the user.

32. A computer-implemented method, comprising:

determining whether to provide less than all of an electronic mail message from an estimated time of transfer for the electronic mail message over a new communications link;

determining a format associated with the electronic mail message upon determining to provide less than all of the electronic mail message;

identifying a portion of the electronic mail message based on the determined format;

generating a reduced copy of the electronic mail message from the selected portion;

transmitting the reduced copy to a user; and downloading the electronic mail message upon estimating at a later time that the transfer data rate has increased.

33. The method of claim 32, wherein determining to provide less than all of the electronic mail message includes determining based upon an estimated data transfer rate and the size of the electronic mail message.

34. The method of claim 32, wherein downloading the electronic mail message includes trickle downloading at least the remaining portion of the electronic mail message.

35. The method of claim 32, further comprising trickle uploading an electronic mail message.

36. The method of claim 32, wherein determining whether to provide less than all of the electronic mail message from the estimated time of transfer for the electronic mail message includes comparing the estimated time of transfer to transfer criteria in a user profile.

* * * * *